United States Patent [19]
Meitinger

[11] Patent Number: 6,079,549
[45] Date of Patent: *Jun. 27, 2000

[54] DRIVER UNIT FOR AN ELECTRICALLY DRIVEN VIBRATORY CONVEYOR

[75] Inventor: Thomas Heinz Meitinger, Iggingen, Germany

[73] Assignee: MRW Digit Electronicgerate GmbH, Schwabisch-Gmund, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/703,426

[22] Filed: Aug. 26, 1996

[51] Int. Cl.$^7$ .................................................. B65G 25/00
[52] U.S. Cl. ............................ 198/751; 198/762; 198/769
[58] Field of Search ................................. 198/751, 761, 198/762, 769

[56] References Cited

U.S. PATENT DOCUMENTS

| | | | |
|---|---|---|---|
| 2,280,056 | 4/1942 | Broekhuysen | 198/769 |
| 4,331,263 | 5/1982 | Brown | 198/769 |
| 5,074,403 | 12/1991 | Myhre | 198/751 |
| 5,080,218 | 1/1992 | Izume et al. | 198/751 |
| 5,145,054 | 9/1992 | Nelson | 198/751 |
| 5,777,232 | 7/1998 | Kurita et al. | 198/751 |
| 5,865,297 | 2/1999 | Chiba et al. | 198/751 |
| 5,931,285 | 8/1999 | Madsen et al. | 198/761 |

FOREIGN PATENT DOCUMENTS

| | | | |
|---|---|---|---|
| 75716 | 4/1986 | Japan | 198/769 |

*Primary Examiner*—Joseph E. Valenza
*Attorney, Agent, or Firm*—Townsend and Townsend and Crew LLP

[57] ABSTRACT

A drive circuit for an electromechanically excited vibratory conveyor responds to the inductance fluctuations of the conveyor drive coil due to mechanical vibration so as to feed the coil with drive pulses having a repetition frequency commensurate with the natural frequency of the mechanical vibration. Phase and duration of the drive pulses are automatically regulated.

12 Claims, 2 Drawing Sheets

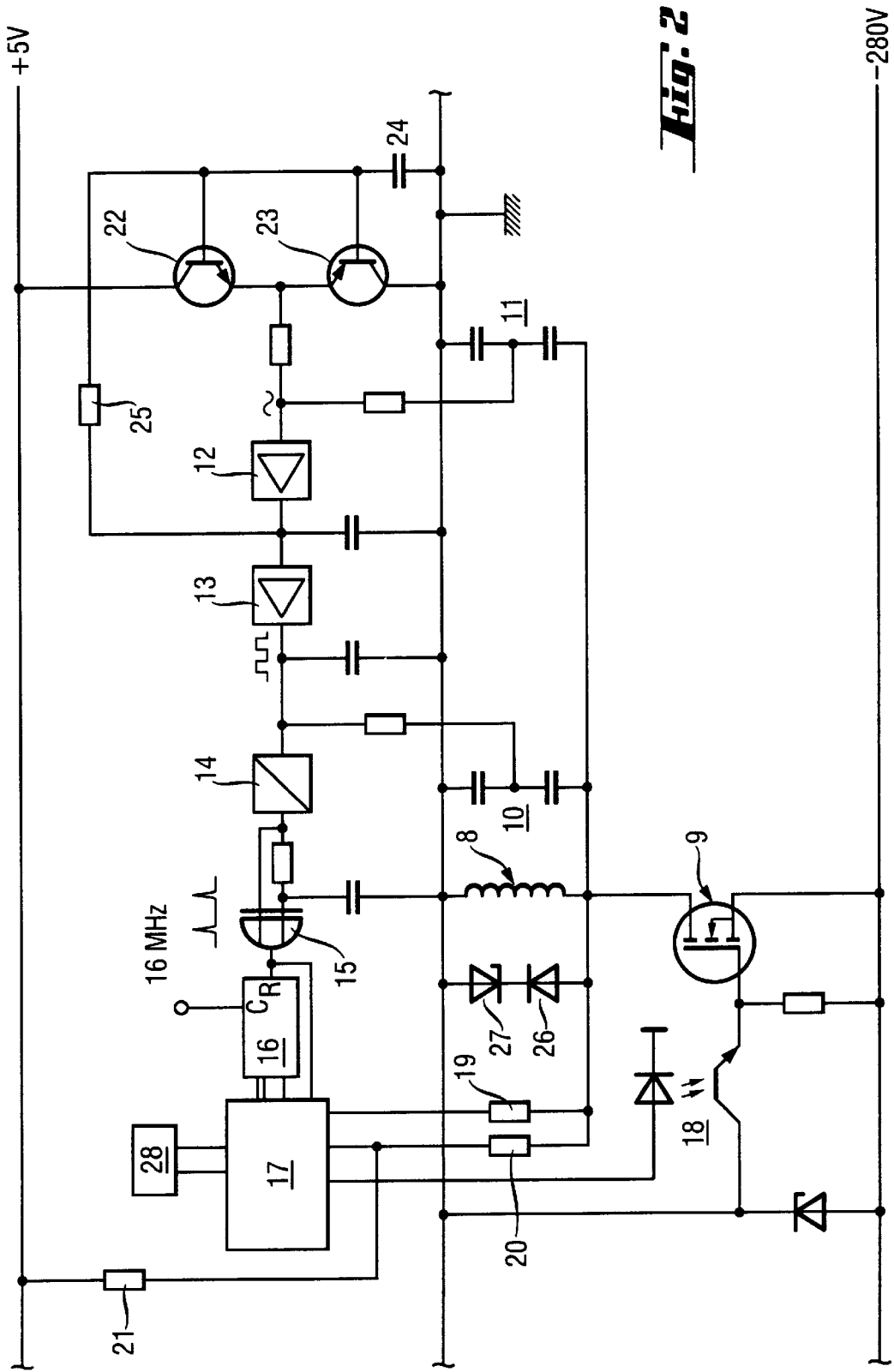

DRIVER UNIT FOR AN ELECTRICALLY DRIVEN VIBRATORY CONVEYOR

BACKGROUND OF THE INVENTION

1. Field of the Invention

The present invention relates to an electrically driven vibratory conveyor.

2. Description of the Prior Art

Vibratory conveyors comprise a stationary frame such as a base plate, on which springs are mounted. The springs support a conveyor element such as a cup, a plate or the like. The springs and the conveyor element form a vibratable mass-spring-system which may be electromagnetically driven to oscillate. For this purpose, at least one soft iron yoke carrying at least one coil is mounted on the frame while the conveyor element carries a soft iron armature defining with the yoke an air gap. If the coil or coils are excited with AC current the conveyor element will oscillate in synchronism with the AC frequency, in particular with 100 oscillations per second on a mains frequency of 50 Hz.

The exciting frequency will rarely coincide with the resonant frequency of the mass-spring-system although this would result in the configuration of least energy consumption. Moreover, the resonant frequency of the mechanical system is not constant but depends upon the (additional) mass of the conveyed parts.

It is evident that a sensor may be mounted on the mechanical system so as to monitor the actual oscillation frequency and to feed it back to an amplifier which delivers the exciting currents for the coil or coils. Such conveyors are disclosed for example in German published patent applications DE-A-41 42 398 and DE-A-36 44 811.

Conveyors of the type defined above, however, are not provided with such pickup systems and would have to be modified if the user wanted to operate them in the resonant mode.

It is therefore an object of the present invention to provide a driver unit for electromagnetically vibratable conveyors to be driven at least close to the resonant mode and wherein no modifications of the mechanical system need be provided.

SUMMARY OF THE INVENTION

In accordance with the present invention, fluctuations of the inductance of the electromagnetic drive means, caused by the air gap variations due to the mechanical oscillations, are processed. Preferably, the coil is connected into an electrical oscillator circuit so as to determine the resonant frequency of the latter. This circuit forms together with amplifier circuits an electrical oscillator. The oscillations of the latter are frequency modulated with the frequency of the mechanical vibrations because the inductor varies periodically in synchronism with the mechanical vibrations. Preferably, the duration of the period of those vibrations is processed. The fluctuations of the latter, i.e., the modulation "depth," will be higher as the vibration amplitude of the mechanical oscillation increases. Thus, both the phase position and the intensity of the drive pulses can be controlled, and are preferably regulated automatically using a servo loop.

An embodiment of the invention is illustrated in the attached drawings and will be explained in detail hereunder with reference thereto.

BRIEF DESCRIPTION OF THE DRAWINGS

FIG. 2 illustrates the circuit diagram of the driver unit in accordance with the invention.

DESCRIPTION OF THE PREFERRED EMBODIMENTS

Figure 1:
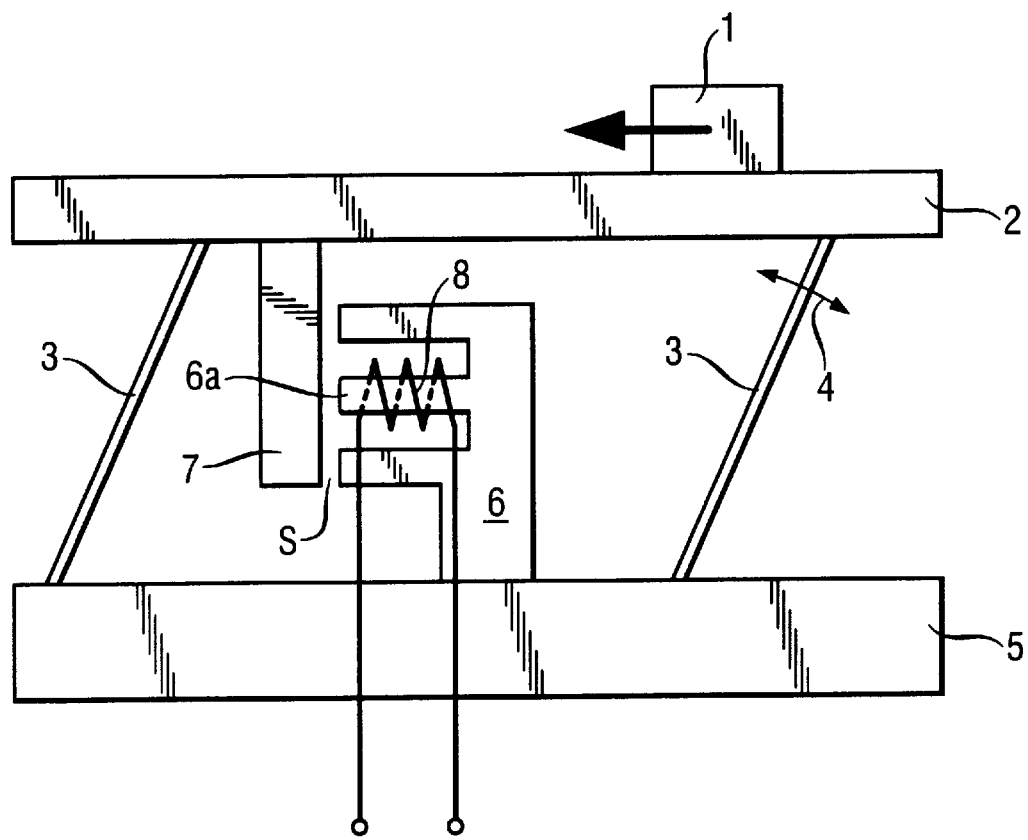
FIG. 1 illustrates schematically a side elevation of a conventional vibratory conveyor.

Referring first to FIG. 1, a conveyor element which in the example is a conveyor plate 2 supported on springs 3 excited to vibrate in a direction indicated by arrow 4 so as to convey objects 1 in a direction indicated by the arrow of object 1. The springs are mounted on a base plate 5 which moreover carries a soft iron yoke 6. The yoke defines, together with an armature 7 mounted on conveyor plate 2, an air gap. A coil 8 is disposed on yoke 6, the coil being driven with driver pulses so as to excite mechanical vibrations of the spring-plate-objects-system. The repetition frequency of the driver pulses should at least approximate the natural frequency of the vibratable mechanical system. The mechanical vibration amplitude may be affected by the amplitude and/or the duration (width) of the drive pulses. The natural frequency of available conveyors is usually in a range of from about 30 Hz to 150 Hz.

The inductance of the exciting system comprised of yoke, coil, and armature fluctuates in synchronism with the vibrations because the air gap varies periodically. In accordance with the present invention, those inductance fluctuations are utilized to generate a control signal for the drive unit.

Referring now to FIG. 2, coil 8 is grounded with one of its ends while its other end is connected, via a switching transistor 9, to a DC voltage carrying conductor. The DC voltage may be full-wave rectified and smoothed mains voltage. Coil 8 forms together with two pairs of capacitors 10, 11 an electric resonant circuit having its own natural frequency which, in use of the conveyor, varies in synchronism with the vibrations of the latter; the circuit resonant frequency will generally be in the order of some ten KHz. The resonant circuit is excited by means of the two amplifiers 12 and 13. Two transistors 22 and 23 are disposed in a feedback path of amplifier 12, the transistors serving the purpose to balance the high voltage transients across coil 8 in that the output of amplifier 12 is coupled via resistor 25 to their base terminals. In result, the working point at the amplifier input returns rapidly to its normal position within the intervals between the drive pulses.

The square voltage at the output of amplifier 13 is converted into needle pulses by means of inverter 14 and EXOR gate 15. The temporal spacings between successive needle pulses are equal to the period of the actual oscillation frequency of the resonant LC circuit.

A counter 16 is incremented at its counting input with a fixed frequency of, for example, 16 MHz, and the actual count is fed to a central processing unit, such as for example a normal microprocessor. The needle pulse from gate 15 signals to the central processing unit to process the actual count, and the same needle pulse resets the counter to zero.

The count thus fluctuates in synchronism with the mechanical vibrations of the conveyor so that the central processing unit may derive therefrom the actual position of the conveyor element and may calculate the most efficient instant for the drive pulse. Moreover, the difference between maximum count and minimum count represents the vibration amplitude of the conveyor, amplitude which may be adjusted or automatically regulated by a corresponding selection of the drive pulse duration.

The drive pulses are triggered by the central processing unit 17 via an opto-coupler 18 at the input of switching transistor 9. The voltage peaks across the coil 8 caused by the energy stored in the windings are discharged via diodes 26, 27. The actual value of the drive pulse is fed back to the central processing unit by means of resistors 19, 20, 21.

An adjustment panel 28 is connected to the central processing unit and permits the user to set target values for the vibration amplitude of the conveyor and the phase position of the drive pulses.

If a quiescent DC current is flowing in the coil, AC voltages will be induced therein in synchronism with the conveyor vibrations which may be processed to generate the drive pulses provided that the DC current is sufficiently high to result in a convenient signal-to-noise ratio.

What is claim is:

1. A drive unit for an electromagnetically excited vibratory conveyor having an armature and a yoke, said drive unit comprising an oscillator circuit including a drive coil disposed on said yoke, said drive coil having an inductance fluctuating responsive to mechanical vibrations of said armature, said oscillator circuit oscillating with an oscillator frequency fluctuating in synchronism with fluctuations of said inductance; and a processing unit for processing said oscillator frequency to define at least temporal instants of drive pulse supply to said drive coil and periodically supplying drive pulses to said drive coil, whereby mechanical vibrations of said conveyor are detected directly by said drive coil in said oscillator circuit with the inductance of said drive coil fluctuating in response to said mechanical vibrations.

2. The drive unit of claim 1 wherein said processing unit is configured to process a period duration of said fluctuations.

3. The drive unit of claim 1 wherein said processing unit is configured to define an amplitude of said drive pulses.

4. The drive unit of claim 1 wherein said processing unit is configured to define a duration of said drive pulses.

5. The drive unit of claim 1 wherein said processing unit processes a difference between a maximum period duration and a minimum period duration as a representation of amplitudes of said mechanical vibrations.

6. The drive unit of claim 1 further comprising active components for stabilizing a working point of said oscillator circuit.

7. The drive unit of claim 1 further comprising servo means for said temporal instants.

8. The drive unit of claim 1 further comprising servo means for a drive pulse duration.

9. The drive unit of claim 1 wherein said oscillator circuit further includes at least one capacitor.

10. A vibratory conveyor comprising:
a stationary base;
spring elements mounted on said base;
a conveyor element supported by said spring elements and forming therewith a vibratable system;
a soft iron yoke coupled with one of said base and said conveyor element;
an armature defining with said yoke an air gap, one of said yoke and said armature being mounted on said stationary base and the other of said yoke and said armature being mounted on said conveyor element; and
a drive unit comprising an oscillator circuit oscillating with an oscillator frequency fluctuating in synchronism with fluctuations of said air gap, said oscillator circuit including a drive coil disposed on said yoke, said drive coil having an inductance fluctuating responsive to fluctuations in size of said air gap, said drive unit processing said oscillator frequency to define at least temporal instants of drive pulse supply to said drive coil and periodically supplying drive pulses to said drive coil, whereby mechanical vibrations of said conveyor are detected directly by said drive coil in said oscillator circuit with the inductance of said drive coil fluctuating in response to said mechanical vibrations.

11. A drive unit for an electromagnetically excited vibratory conveyor having an armature and a yoke, said drive unit comprising an oscillator circuit including a drive coil disposed on said yoke, said drive coil having an inductance fluctuating responsive to mechanical vibrations of said armature, said oscillator circuit oscillating with an oscillator frequency fluctuating in synchronism with fluctuations of said inductance; and means for processing said oscillator frequency to define at least temporal instants of drive pulse supply to said drive coil and periodically supplying drive pulses to said drive coil, whereby mechanical vibrations of said conveyor are detected directly by said drive coil in said oscillator circuit with the inductance of said drive coil fluctuating in response to said mechanical vibrations.

12. A drive unit for an electromagnetically excited vibratory conveyor having an armature and a yoke, said drive unit comprising an oscillator circuit including a drive coil disposed on said yoke and means for feeding said drive coil with a DC bias current, said drive coil having an inductance fluctuating responsive to mechanical vibrations of said armature; and a processing unit for processing fluctuations of said inductance to define at least temporal instants of drive pulse supply to said drive coil and periodically supplying drive pulses to said drive coil, whereby mechanical vibrations of said conveyor are detected directly by said drive coil in said oscillator circuit with the inductance of said drive coil fluctuating in response to said mechanical vibrations.

* * * * *